C. O. ANDERSON.
ATTACHMENT FOR MILKING APPARATUS.
APPLICATION FILED JUNE 5, 1918.
1,301,992.
Patented Apr. 29, 1919.
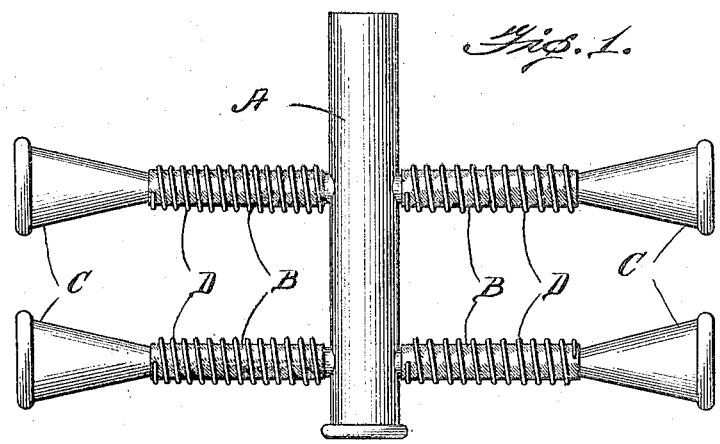
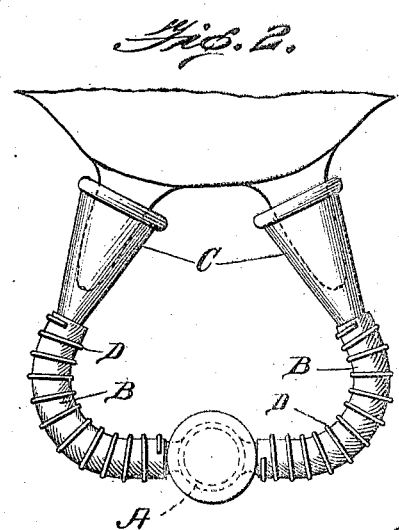
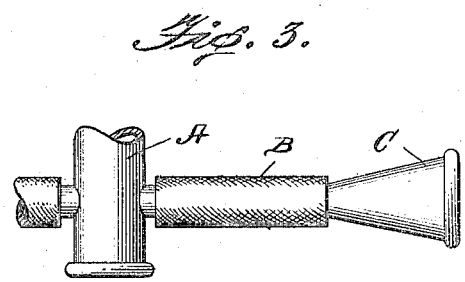
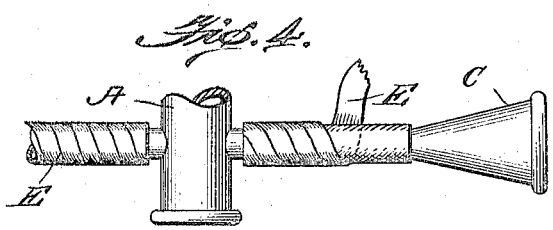

UNITED STATES PATENT OFFICE.

CARL OSCAR ANDERSON, OF SPRINGFIELD, ILLINOIS.

ATTACHMENT FOR MILKING APPARATUS.

1,301,992.  Specification of Letters Patent.  Patented Apr. 29, 1919.

Application filed June 5, 1918. Serial No. 238,376.

*To all whom it may concern:*

Be it known that I, CARL OSCAR ANDERSON, a citizen of the United States, residing at Springfield in the county of Sangamon and State of Illinois, have invented certain new and useful Improvements in Attachments for Milking Apparatus; and I do hereby declare the following to be a full, clear, and exact description of the invention, such as will enable others skilled in the art to which it appertains to make and use the same.

This invention relates to cow milking machines, and more particularly to an attachment for connection with the teats whereby all of the teats may be milked to a finish regardless of any unevenness or lopsidedness of the udder or a difference in the length of the teats.

In milking machines as ordinarily constructed, the teat cups are generally connected by short rubber tubes to a short pipe having four nipples thereon from which the tubes extend and diverge slightly from each other in such manner that when the teat cups are placed on or applied to the cow's teats the short rubber tubes extend practically in a straight line between the cups and the pipe, and owing to the fact that many cows have uneven or lop-sided udders, with one or more teats hanging down farther than the others, the short or higher teats are first milked out, while the longer ones remain unfinished, necessitating in many cases the finishing of the milking of the longer teat by hand.

The objects of my invention are to provide a simple, efficient and inexpensive device whereby an even or uniform pull on all of the teats is exerted, regardless of the unevenness of the teats or udder, and the desired result produced and the milking operation completed practically simultaneously on all of the teats, whether long or short, and without irritating either teat or udder and with less discomfort to the cow than is possible by the use of similar devices as heretofore ordinarily constructed.

The invention will first be hereinafter more particularly described, with reference to the accompanying drawings, which form a part of this specification, and then pointed out in the claims at the end of the description.

In said drawings:—

Figure 1 is a plan view of a device embodying my invention;

Fig. 2 is a side elevation of the same showing the teat cups on the teats in position for milking;

Fig. 3 is a detail plan view partly broken away of a modified form of my invention, and, Fig. 4 is a plan view of another modification, parts thereof being broken away.

Referring to said drawings, in which the same reference letters are used to denote corresponding parts in different views, the letter A, may denote a pipe or tube of the form usually employed in milking apparatus having one end closed and its other end connected to a milk receiver or chamber (not shown) and also having thereon, at its closed free end, a plurality of nipples, preferably two upon each side, one being diametrically opposite another, as shown. To each nipple is attached one end of a short rubber tube B, carrying at its other end a teat cup C, preferably such as shown in my Patent No. 1,213,814, granted June 30, 1917. The rubber tubes B, are designed and adapted to exert a certain amount of resistance to bending, and to this end coiled or other suitable springs D, may be fitted thereon, so that when applied to the teats of a cow a pull on all of the teats will be exerted, but in different directions, and evenly distributed, the direction of the pull on each teat being outward and downward, so that whether the udder may be uneven or lop-sided, or whether one or more teats may be shorter than the others the pull will be uniform on all of the teats, and both teats and udder may be kept in a healthy condition and the milking operation performed expeditiously and completely without discomfort to the cow.

In operation, the teat cups are placed one by one over the teats, so that each will exert an outward and downward pull, very much the same as the pull upon the teats exerted by a sucking calf, and the pull upon one is counterbalanced by the pull upon an adjacent teat, the pull upon all being evenly distributed and made uniform, so that the milking operation may be completed without liability of finishing one teat in advance of another and rendering necessary the completion of the milking operation on one or more teats by hand, as is often necessary in using similar devices, such as have heretofore been used in milking apparatus.

In the modification shown in Fig. 3 of the drawings, instead of a coiled spring encircling the rubber tube, the walls of the tube are of sufficient thickness to exert the required resistance to bending. In the modification shown in Fig. 4 of the drawings, the rubber tube is reinforced by a winding of cloth or other suitable material E, thereon, so that sufficient resistance to bending will be exerted to accomplish the desired result. Other means may also be employed for this purpose without departing from the spirit and scope of my invention, and I do not desire to limit my claims to the specific means illustrated and described.

Having thus described my invention, what I claim as new and desire to secure by Letters Patent of the United States, is:—

1. An attachment for milking apparatus comprising a connector pipe having nipples projecting therefrom in opposite directions, and resilient tubes extending from said nipples each having a teat cup on its free end; said tubes being adapted to project normally in straight lines and to be bent toward each other and applied to the teats and when so applied to exert a downward and outward pull acting uniformly on all of the teats and to spring back to normal position when released.

2. An attachment for milking apparatus comprising a connector pipe having nipples projecting therefrom in opposite directions, and tubes extending from said nipples each having a teat cup on its free end; said tubes having coiled springs thereon and adapted to be bent toward each other and applied to the teats and when so applied to exert a downward and outward pull acting uniformly on all of the teats.

3. An attachment for milking apparatus comprising a connector pipe having nipples projecting therefrom in opposite directions, and rubber tubes each secured at one end to one of said nipples and having a teat cup on its free end, coiled springs placed on said tubes tending normally to hold them extended in substantially a horizontal position and adapted to permit them to be bent and applied to the teats so as to exert a downward and outward pull uniformly on all of the teats.

In testimony whereof I affix my signature in the presence of two witnesses.

CARL OSCAR ANDERSON.

Witnesses:
E. S. MULLEY,
C. B. WUNDERLICH.